United States Patent
Kameyama et al.

(10) Patent No.: US 11,906,545 B2
(45) Date of Patent: Feb. 20, 2024

(54) LASER RADAR DEVICE, WIND POWER GENERATOR, AND WIND MEASUREMENT METHOD

(71) Applicant: MITSUBISHI ELECTRIC CORPORATION, Tokyo (JP)

(72) Inventors: Shumpei Kameyama, Tokyo (JP); Nobuki Kotake, Tokyo (JP); Yutaka Kajiyama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 721 days.

(21) Appl. No.: 17/028,127

(22) Filed: Sep. 22, 2020

(65) Prior Publication Data

US 2021/0003604 A1    Jan. 7, 2021

Related U.S. Application Data

(63) Continuation of application No. PCT/JP2018/017028, filed on Apr. 26, 2018.

(51) Int. Cl.
*G01P 5/26* (2006.01)
*F03D 80/00* (2016.01)
*G01S 17/95* (2006.01)

(52) U.S. Cl.
CPC .......... *G01P 5/26* (2013.01); *F03D 80/00* (2016.05); *G01S 17/95* (2013.01)

(58) Field of Classification Search
None
See application file for complete search history.

(56) References Cited

U.S. PATENT DOCUMENTS

| | | | |
|---|---|---|---|
| 6,946,751 B2 | 9/2005 | Yoshida et al. | |
| 7,281,891 B2 * | 10/2007 | Smith | G01P 5/26 |
| | | | 416/61 |
| 7,391,506 B2 * | 6/2008 | Harris | G01S 17/95 |
| | | | 356/342 |
| 9,851,444 B2 * | 12/2017 | Kotake | G01P 5/26 |
| 9,977,045 B2 * | 5/2018 | Tchoryk | G01S 7/4816 |
| 10,253,756 B2 * | 4/2019 | Haraguchi | G01S 17/95 |
| 10,451,045 B2 * | 10/2019 | Davoust | G01P 5/26 |
| 11,112,502 B2 * | 9/2021 | Kotake | G01S 17/58 |
| 2006/0140764 A1 | 6/2006 | Smith et al. | |
| 2009/0046289 A1 * | 2/2009 | Caldwell | G01P 13/025 |
| | | | 356/341 |

(Continued)

FOREIGN PATENT DOCUMENTS

CN         105452899 A      3/2016
EP           1597592 B1      5/2009

(Continued)

OTHER PUBLICATIONS

European Communication pursuant to Article 94(3) EPC for European Application No. 18916872.7. dated Jun. 23, 2022.

(Continued)

*Primary Examiner* — Dominic J Bologna
*Assistant Examiner* — Jarreas Underwood
(74) *Attorney, Agent, or Firm* — BIRCH, STEWART, KOLASCH & BIRCH, LLP (57) ABSTRACT

A laser radar device calculates a wind speed for each of a plurality of divided sections obtained by dividing a trajectory drawn by a laser beam in front of a wind turbine.

9 Claims, 6 Drawing Sheets (56) References Cited

U.S. PATENT DOCUMENTS

| | | | | |
|---|---|---|---|---|
| 2012/0050750 A1* | 3/2012 | Hays | ............... | G01P 5/26 |
| | | | | 356/519 |
| 2015/0185328 A1* | 7/2015 | Kotake | ............ | G01S 17/58 |
| | | | | 356/28.5 |
| 2015/0247953 A1* | 9/2015 | O'Brien | ............ | G01W 1/10 |
| | | | | 416/41 |
| 2016/0146195 A1 | 5/2016 | Holtom | | |
| 2021/0016872 A1* | 1/2021 | Inokuchi | ............ | B64D 45/00 |

FOREIGN PATENT DOCUMENTS

| | | |
|---|---|---|
| JP | 2006-519334 A | 8/2006 |
| JP | 4102278 B2 | 6/2008 |
| JP | 2014-55889 A | 3/2014 |
| WO | WO2014/041852 A1 | 3/2014 |

OTHER PUBLICATIONS

International Search Report, issued in PCT/JP2018/017028, PCT/ISA/210, dated Jul. 31, 2018.

Mikkelsen et al., "A spinner-integrated wind lidar for enhanced wind turbine control", Wind Energy, 2013, vol. 16, p. 625-643.

Office Action dated Dec. 20, 2021 in European Patent Application No. 18 916 872.7.

Extended European Search Report dated Feb. 16, 2021 in corresponding European Patent Application No. 18 916 872.7.

Chinese Office Action and Search Report for Chinese Application No. 201880092514.0, dated Nov. 29, 2023, with an English translation.

* cited by examiner

FIG. 9

LASER RADAR DEVICE, WIND POWER GENERATOR, AND WIND MEASUREMENT METHOD

CROSS REFERENCE TO RELATED APPLICATIONS

This application is a Continuation of PCT International Application No. PCT/JP2018/017028 filed on Apr. 26, 2018, which is hereby expressly incorporated by reference into the present application.

TECHNICAL FIELD

The present disclosure relates to a laser radar device for performing wind measurement.

BACKGROUND ART

Conventionally, there has been proposed a technique of measuring a wind speed in front of a wind turbine for a wind power generator using a laser radar device installed on a spinner portion of the wind turbine (for example, see Non-Patent Literature 1). The laser radar device transmits laser light ahead of the wind turbine, receives scattered light scattered by aerosols in the atmosphere, and measures a wind speed using a reception signal of the scattered light. Note that the aerosols are pieces of dust or extremely small floating particles in the atmosphere.

CITATION LIST

Non-Patent Literature

Non-Patent Literature 1: T. Mikkelsen et al., "A spinner-integrated wind lidar for enhanced wind turbine control," Wind Energy, 16, pp. 625-643, 2013.

SUMMARY OF INVENTION

Technical Problem

A conventional laser radar device emits laser light in an oblique direction with respect to the rotating shaft of a wind turbine in order to perform wind measurement in a plurality of directions. Therefore, a laser beam draws a circular trajectory in front of the wind turbine with rotation of a spinner portion. Meanwhile, since the amount of scattered light to be received is extremely small, the laser radar device obtains a signal-to-noise ratio required for wind speed measurement by integrating reception spectra calculated from reception signals of scattered light within a measurement time. However, due to a distribution of wind speed in an altitude direction, when a laser beam moves during a measurement time and the altitude of a measurement position changes, different pieces of wind speed information at different altitudes are mixed, and an error in wind speed measurement becomes larger disadvantageously.

The present invention is made to solve the above problem, and an object of the present disclosure is to obtain a laser radar device capable of measuring a wind speed with high accuracy.

Solution to Problem

A laser radar device according to the present disclosure is installed in a spinner portion of a wind turbine, transmits laser light ahead of the wind turbine, receives scattered light of the laser light scattered at a transmission destination, and includes a trajectory section determining unit, an analyzing and integrating unit, a storing and integrating unit, and a wind speed calculating unit. The trajectory section determining unit determines a divided section in which a laser beam is present among a plurality of divided sections obtained by dividing a trajectory drawn by a laser beam of laser light in front of the wind turbine. Per each divided section in which the trajectory section determining unit has determined that the laser beam is present, the analyzing and integrating unit analyzes reception signals of the scattered light to calculate reception spectra for each distance in a line-of-sight direction of the laser beam, and integrates the calculated reception spectra. The storing and integrating unit stores the reception spectrum calculated for each divided section by the analyzing and integrating unit. The wind speed calculating unit calculates a wind speed for each divided section using the reception spectrum for each divided section input from the storing and integrating unit. The trajectory drawn by the laser beam in front of the wind turbine is divided by the number of divisions for each distance in a line-of-sight direction of the laser beam, and the number of divisions of the trajectory is made smaller in a case where the distance in the line-of-sight direction of the laser beam is short than in a case where the distance is long.

Advantageous Effects of Invention

According to the present disclosure, a laser radar device calculates a wind speed for each of a plurality of divided sections obtained by dividing a trajectory drawn by a laser beam in front of a wind turbine, and therefore can measure the wind speed with high accuracy.

DESCRIPTION OF EMBODIMENTS

Hereinafter, in order to describe the present invention in more detail, embodiments for carrying out the present invention will be described by referring to the attached drawings.

First Embodiment

Figure 1:
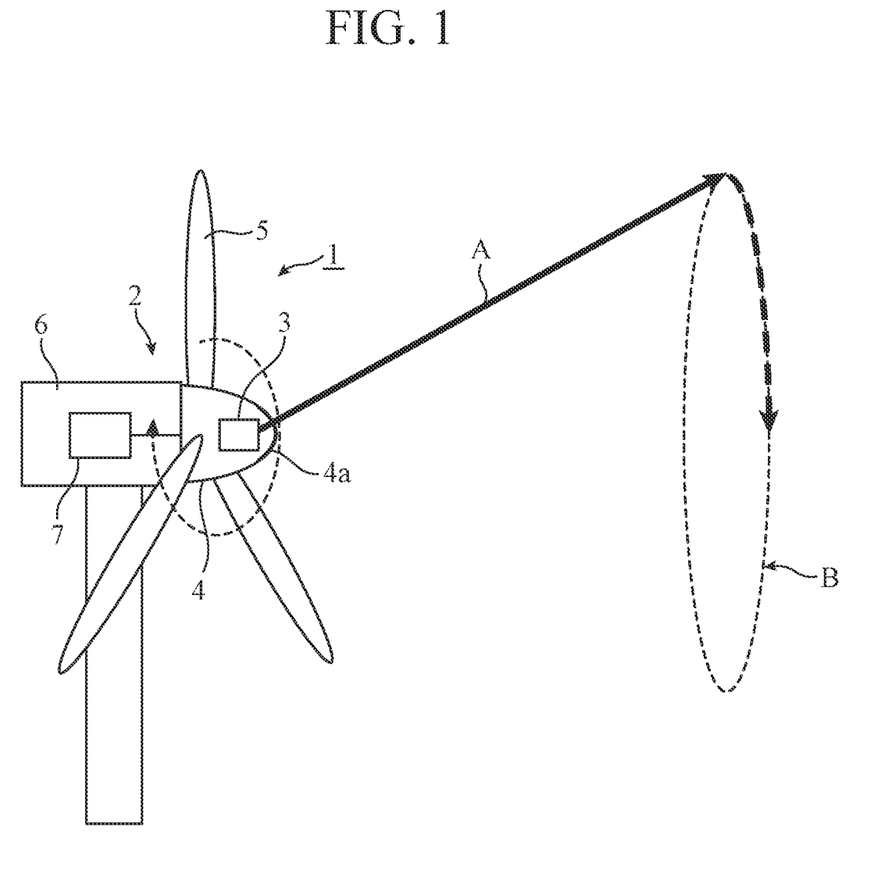
FIG. 1 is a schematic view illustrating a configuration of a wind power generator according to a first embodiment of the present invention.

FIG. 1 is a schematic view illustrating a configuration of a wind power generator 1 according to a first embodiment of the present disclosure.

In FIG. 1, the wind power generator 1 includes a wind turbine 2. A laser radar device 3 according to the first embodiment is installed on a spinner portion 4 of the wind turbine 2. When the wind hits a blade 5 from a front of the wind turbine 2, the blade 5 rotates. The spinner portion 4 rotates together with the blade 5. A rotating shaft of the blade 5 is connected to a rotating shaft of a generator 7 installed on a nacelle portion 6, and when the blade 5 rotates, the rotating shaft of the generator 7 rotates in response to the rotation of the blade 5, and rotating power is converted into electric power.

Laser light emitted from the laser radar device 3 is transmitted to the atmosphere through a window 4a provided at an end of the spinner portion 4. This laser light is scattered by aerosols in the atmosphere at a transmission destination, and the scattered light is received by the laser radar device 3. Since the aerosols are regarded as floating particles that move at the same speed as the wind, a wind speed at a position where the aerosols are present can be measured by detecting moving states of the aerosols.

In addition, in order to measure wind speeds in a plurality of directions, the laser radar device 3 transmits laser light in an oblique direction with respect to a rotating shaft direction of the wind turbine 2 and receives scattered light of the laser light. Since the laser radar device 3 rotates with rotation of the spinner portion 4, conical scanning is performed with a laser beam A of the laser light, and the laser beam A draws a circular trajectory B in front of the wind turbine 2 as illustrated in FIG. 1. The trajectory B is defined for each distance in a line-of-sight direction of the laser beam A. For example, in a case of a movement trajectory of a focal point of the laser beam A, the size of the trajectory B can be changed by changing a focusing distance (measurement distance) of the laser beam A.

When a wind speed at a long distance is measured with the laser beam A, the size of the trajectory B is large. As described above, since the wind speed has a distribution in an altitude direction, on the trajectory B, a wind speed at a measurement position with the highest altitude may be significantly different from that at a measurement position with the lowest altitude.

Accordingly, in the laser radar device 3 according to the first embodiment, by calculating a wind speed for each of a plurality of divided sections obtained by dividing a trajectory drawn by the laser beam A in front of the wind turbine 2, a difference depending on the altitude of a measurement position is decreased, and wind speed measurement with high accuracy is implemented.

Figure 2:
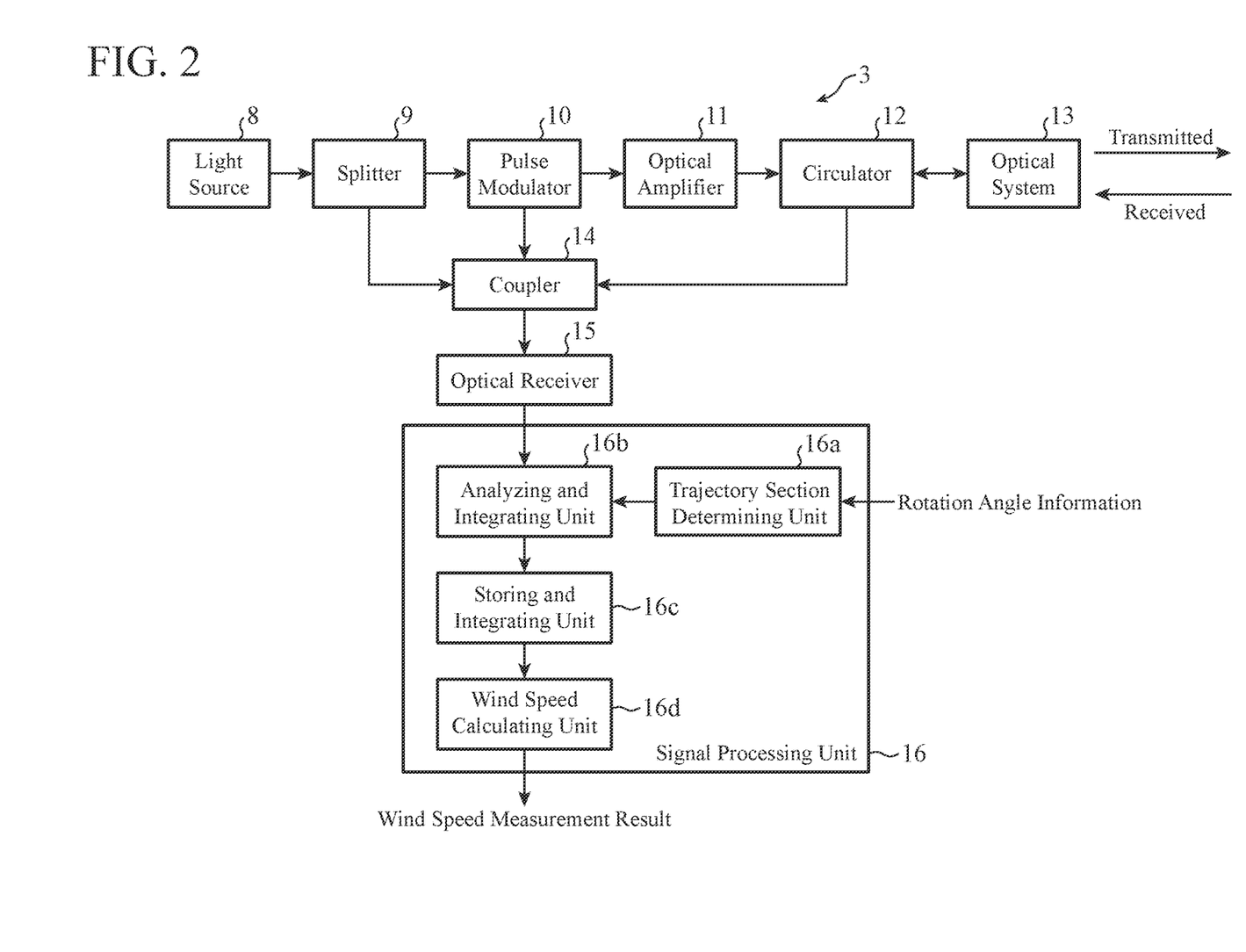
FIG. 2 is a block diagram illustrating a configuration of a laser radar device according to the first embodiment.

FIG. 2 is a block diagram illustrating a configuration of the laser radar device 3 according to the first embodiment.

The laser radar device 3 is installed on the spinner portion 4 of the wind turbine 2, transmits laser light in an oblique direction with respect to a rotating shaft direction of the wind turbine 2 while rotating together with the spinner portion 4, and receives scattered light of the laser light. As illustrated in FIG. 2, the laser radar device 3 includes a light source 8, a splitter 9, a pulse modulator 10, an optical amplifier 11, a circulator 12, an optical system 13, a coupler 14, an optical receiver 15, and a signal processing unit 16.

The principle of wind measurement by the laser radar device 3 illustrated in FIG. 2 is a so-called coherent method. Note that the laser radar device 3 according to the first embodiment may perform wind measurement according to an existing principle other than the coherent method. In the example illustrated in FIG. 2, the laser radar device 3 is a pulse type laser, but may be a continuous wave (CW) type laser.

Laser light output from the light source 8 is distributed to the pulse modulator 10 and the coupler 14 by the splitter 9. Laser light distributed to the pulse modulator 10 is transmission light, and laser light distributed to the coupler 14 is local light. The pulse modulator 10 pulse-modulates the transmission light and sends the pulse-modulated transmission light to the optical amplifier 11. The transmission light amplified by the optical amplifier 11 is sent to the optical system 13 via the circulator 12. The optical system 13 transmits the transmission light to the atmosphere through the window 4a of the spinner portion 4.

The transmission light hits aerosols in the atmosphere, is scattered, and returns to the optical system 13 as scattered light. Since the aerosols ride on the wind and move at the same speed as the wind, the frequency of the scattered light has a Doppler frequency shift depending on a wind speed. The scattered light received by the optical system 13 is sent to the coupler 14 as reception light by the circulator 12. The coupler 14 combines the reception light with the local light and sends the combined light to the optical receiver 15. The optical receiver 15 coherently detects the light input from the circulator 12. The detected signal is sent to the signal processing unit 16 as a reception signal by the optical receiver 15.

The signal processing unit 16 analyzes the reception signal input from the optical receiver 15, calculates a reception spectrum for each distance in a line-of-sight direction of the laser beam A, and calculates a wind speed using the calculated reception spectrum. The signal processing unit 16 includes a trajectory section determining unit 16a, an analyzing and integrating unit 16b, a storing and integrating unit 16c, and a wind speed calculating unit 16d as functional configuration units.

The trajectory section determining unit 16a determines a divided section in which the laser beam A is present among a plurality of divided sections obtained by dividing the trajectory B drawn in front of the wind turbine 2 by the laser beam A.

Figure 3:
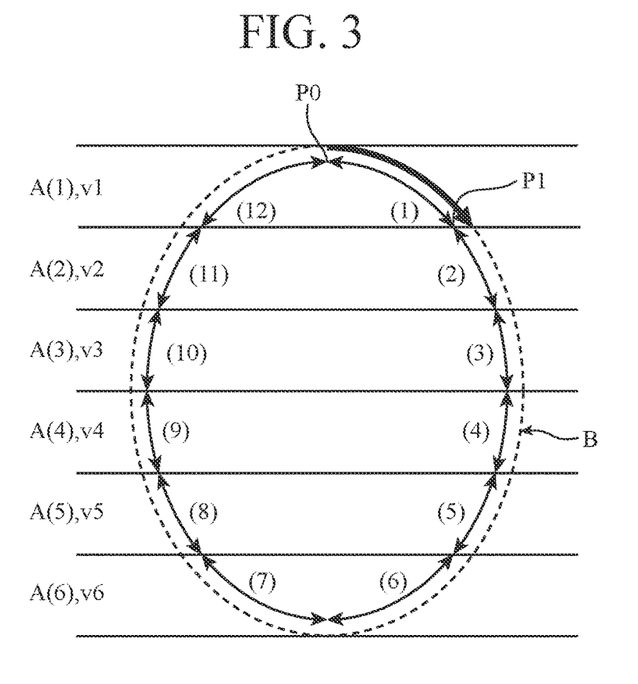
FIG. 3 is a diagram illustrating a trajectory of a laser beam.

FIG. 3 is a diagram illustrating the trajectory B of the laser beam A. By rotation of the laser radar device 3 together with the spinner portion 4, the circular trajectory B is drawn by the laser beam A in front of the wind turbine 2 as illustrated in FIG. 3. Since the trajectory B is uniquely determined by a laser light transmission direction and a measurement distance for which wind measurement is performed, the laser radar device 3 according to the first embodiment divides the trajectory B into a plurality of divided sections (1) to (12) and measures a wind speed for each divided section.

A section in which a wind speed can be regarded to be uniform in a space corresponding to the section is set as a divided section. In the example illustrated in FIG. 3, it is assumed that there are six altitude sections A(1) to A(6) and that wind speeds in a space corresponding to these altitude sections are v1 to v6. Among the 12 divided sections (1) to (12), the divided sections (1) and (12) are associated with an altitude section A(1). The divided sections (2) and (11) are associated with an altitude section A(2), the divided sections (3) and (10) are associated with an altitude section A(1), and the divided sections (4) and (9) are associated with an altitude section A(4). The divided sections (5) and (8) are associated with an altitude section A(5), and the divided sections (6) and (7) are associated with an altitude section A(6).

Per each divided section in which the trajectory section determining unit 16a has determined that the laser beam A is present, the analyzing and integrating unit 16b analyzes reception signals input from the optical receiver 15 to calculate reception spectra for each distance in a line-of-sight direction of the laser beam A, and integrates the calculated reception spectra. For example, the analyzing and integrating unit 16b continues integration of reception spectra until the laser beam A moves from a divided section in which the trajectory section determining unit 16a has determined that the laser beam A is present to a next divided section. This integration process improves a signal-to-noise ratio (hereinafter, referred to as SN ratio) of the reception spectrum. The SN ratio of a reception spectrum is, for example, a reception SN ratio determined from a peak intensity of the reception spectrum.

The storing and integrating unit 16c stores a reception spectrum calculated by the analyzing and integrating unit 16b for each divided section. In the first embodiment, it is assumed that by integration of reception spectra within a measurement time for each divided section by the analyzing and integrating unit 16b, the SN ratio of the reception spectrum is improved so as to be larger than a threshold. Note that the threshold is a threshold related to a reception SN ratio, an SN ratio larger than the threshold is an acceptable SN ratio, and an SN ratio equal to or smaller than the threshold is an unacceptable SN ratio.

The wind speed calculating unit 16d calculates a wind speed for each divided section using a reception spectrum for each divided section input from the storing and integrating unit 16c. For example, the wind speed calculating unit 16d individually calculates a wind speed for each of the divided sections (1) to (12) illustrated in FIG. 3.

Next, operations will be described.

Figure 4:
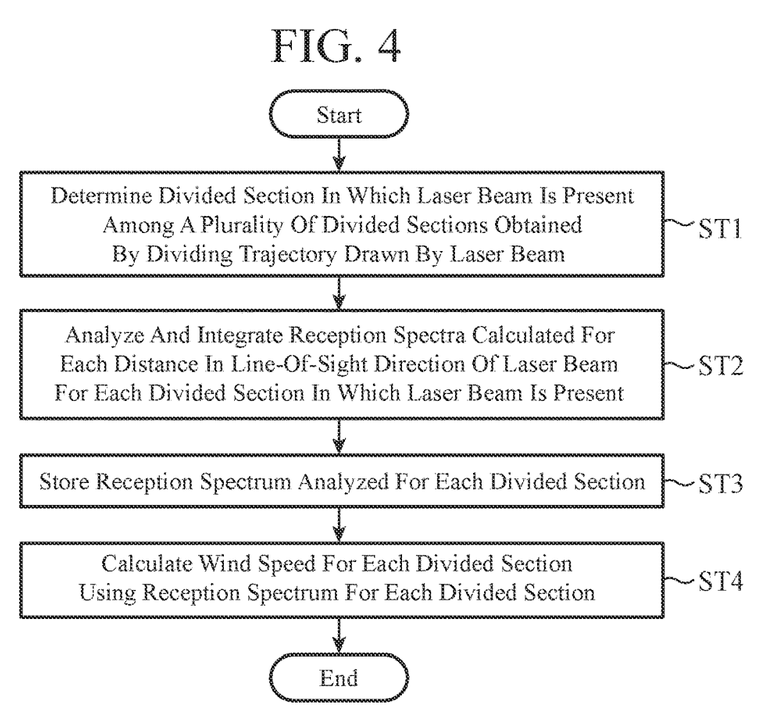
FIG. 4 is a flowchart illustrating a wind measurement method according to the first embodiment.

FIG. 4 is a flowchart illustrating a wind measurement method according to the first embodiment, and illustrates operations of the signal processing unit 16 in FIG. 2.

The trajectory section determining unit 16a determines a divided section in which the laser beam A is present among the plurality of divided sections (1) to (12) obtained by dividing the trajectory B drawn by the laser beam A (step ST1). For example, when rotation angle information indicating a current rotation angle of the wind turbine 2 is input from the wind turbine 2, the trajectory section determining unit 16a determines whether the laser beam A is present in any one of the divided sections by comparing a section of the rotation angle of the wind turbine 2 for each divided section with the rotation angle indicated by the rotation angle information.

Description will be made more specifically by referring to FIG. 3. In the trajectory section determining unit 16a, a section of the rotation angle of the wind turbine 2 (θ0 to θ1) is set from a measurement start point P0 to a measurement end point P1 in the divided section (1), and the rotation angle of the wind turbine 2 is set from a measurement start point to a measurement end point also in each of the divided sections (2) to (12). For example, when the current rotation angle of the wind turbine 2 is θa (θ0<θa<θ1), the trajectory section determining unit 16a determines that the laser beam A is moving in the divided section (1) with the trajectory indicated by the thick arrow in FIG. 3, and determines that the laser beam A is present in the divided section (1). The determination result of the trajectory section determining unit 16a is immediately sent to the analyzing and integrating unit 16b.

The analyzing and integrating unit 16b calculates and integrates reception spectra for each divided section in which the trajectory section determining unit 16a has determined that the laser beam A is present (step ST2). For example, the analyzing and integrating unit 16b analyzes reception signals input from the optical receiver 15 and integrates reception spectra calculated for each distance in a line-of-sight direction of the laser beam A.

The analyzing and integrating unit 16b continues integration of reception spectra while the trajectory section determining unit 16a determines that the laser beam A is present in the same divided section. When the trajectory section determining unit 16a determines that the laser beam A is present in the divided section (2) by movement of the laser beam A from the divided section (1), the analyzing and integrating unit 16b stops integration of reception spectra associated with the divided section (1), and outputs information regarding the reception spectrum to the storing and integrating unit 16c.

The storing and integrating unit 16c stores the information indicating the reception spectrum input from the analyzing and integrating unit 16b (step ST3). Since the analyzing and integrating unit 16b outputs the information regarding the reception spectrum calculated for each divided section to the storing and integrating unit 16c, the storing and integrating unit 16c stores the information regarding the reception spectrum for each divided section.

The wind speed calculating unit 16d calculates a wind speed for each divided section using the reception spectrum for each divided section input from the storing and integrating unit 16c (step ST4). For example, since a peak frequency of the reception spectrum corresponds to a Doppler frequency shift, the wind speed calculating unit 16d calculates a wind speed value in a line-of-sight direction of the laser beam A on the basis of a peak frequency detected from the reception spectrum. The wind speed calculating unit 16d calculates a wind speed value for each divided section. A wind speed measurement result is output from the wind speed calculating unit 16d to an external device. An example of the external device is the wind power generator 1. The wind power generator 1 controls the wind turbine 2 on the basis of the wind speed measurement result input from the laser radar device 3 in such a manner that a power generation amount is improved.

The wind speed calculating unit 16d may calculate a wind speed corresponding to an altitude section by statistically processing wind speed values obtained for divided sections associate with the same altitude section. For example, in FIG. 3, the divided section (1) and the divided section (12) are associated with the same altitude section A(1). The wind speed calculating unit 16d may output an average value of a wind speed v1' obtained in the divided section (1) and a wind speed v1" obtained in the divided section (12) as a wind speed v1 in the altitude section A(1).

The functions of the trajectory section determining unit 16a, the analyzing and integrating unit 16b, the storing and integrating unit 16c, and the wind speed calculating unit 16d in the laser radar device 3 are implemented by processing circuitry. That is, the laser radar device 3 includes processing circuitry for executing processes in steps ST1 to ST4 in FIG.

4. This processing circuitry may be dedicated hardware or a central processing unit (CPU) for executing a program stored in a memory.

Figure 5A:
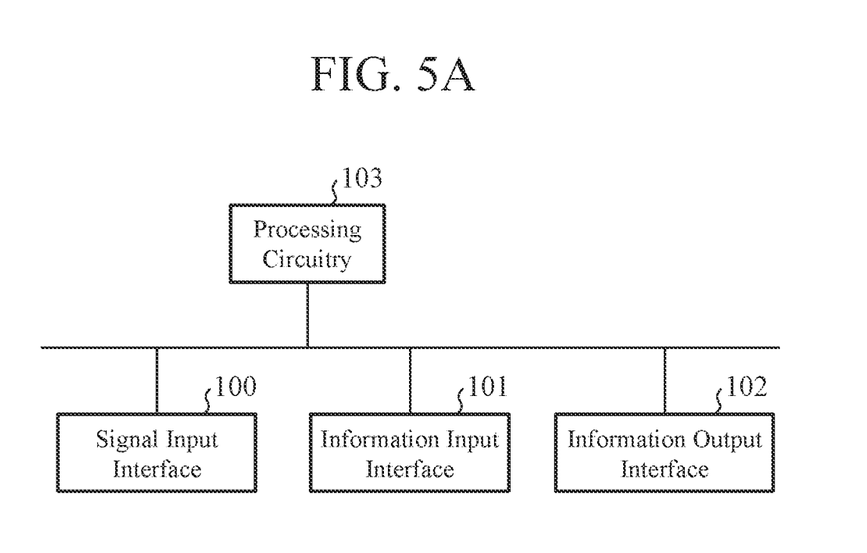
FIG. 5A is a block diagram illustrating a hardware configuration that implements functions of a signal processing unit included in the laser radar device according to the first embodiment.
Figure 5B:
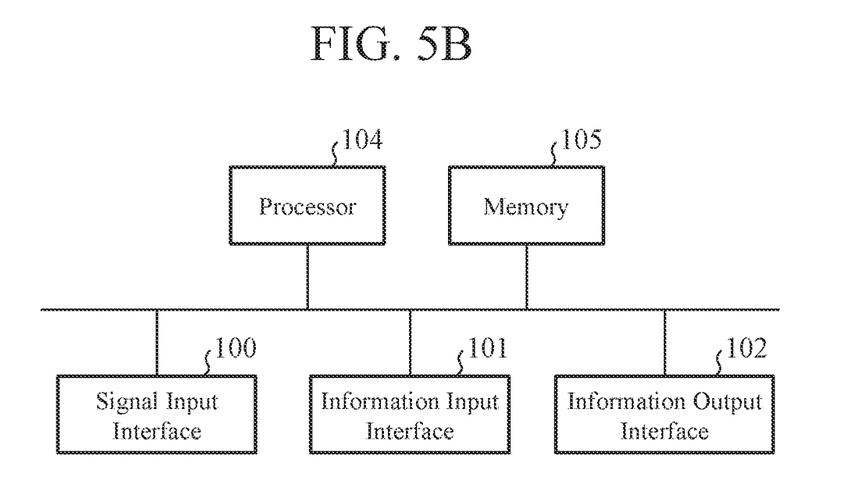
FIG. 5B is a block diagram illustrating a hardware configuration that executes software for implementing the functions of the signal processing unit included in the laser radar device according to the first embodiment.

FIG. 5A is a block diagram illustrating a hardware configuration that implements the functions of the signal processing unit 16 included in the laser radar device 3. FIG. 5B is a block diagram illustrating a hardware configuration that executes software for implementing the functions of the signal processing unit 16 included in the laser radar device 3. In FIGS. 5A and 5B, a signal input interface 100 relays the reception signals input from the optical receiver 15 to the signal processing unit 16. The analyzing and integrating unit 16*b* receives the reception signals from the optical receiver 15 via the signal input interface 100.

An information input interface 101 relays rotation angle information input from the wind turbine 2 to the signal processing unit 16. The trajectory section determining unit 16*a* receives the rotation angle information from the wind turbine 2 via the information input interface 101. An information output interface 102 relays a wind speed measurement result output from the signal processing unit 16 to an external device. The wind speed calculating unit 16*d* outputs the wind speed measurement result to the external device via the information output interface 102. The external device may be the wind power generator 1 as described above.

In a case where the processing circuitry is processing circuitry 103 of dedicated hardware illustrated in FIG. 5A, the processing circuitry 103 is, for example, a single circuit, a composite circuit, a programmed processor, a parallel programmed processor, an application specific integrated circuit (ASIC), a field-programmable gate array (FPGA), or a combination thereof. The functions of the trajectory section determining unit 16*a*, the analyzing and integrating unit 16*b*, the storing and integrating unit 16*c*, and the wind speed calculating unit 16*d* may be implemented by separate processing circuits, or these functions may be implemented collectively by one processing circuit.

In a case where the processing circuitry includes a processor 104 illustrated in FIG. 5B, the functions of the trajectory section determining unit 16*a*, the analyzing and integrating unit 16*b*, the storing and integrating unit 16*c*, and the wind speed calculating unit 16*d* are implemented by software, firmware, or a combination of software and firmware. Note that the software or the firmware is described as a program and stored in a memory 105.

The processor 104 implements the functions of the trajectory section determining unit 16*a*, the analyzing and integrating unit 16*b*, the storing and integrating unit 16*c*, and the wind speed calculating unit 16*d* by reading and executing a program stored in the memory 105. That is, the signal processing unit 16 includes the memory 105 for storing a program that causes processes in steps ST1 to ST4 illustrated in FIG. 4 to be executed as a result when the program is executed by the processor 104. These programs cause a computer to execute the procedures or methods of the trajectory section determining unit 16*a*, the analyzing and integrating unit 16*b*, the storing and integrating unit 16*c*, and the wind speed calculating unit 16*d*. The memory 105 may be a computer-readable storage medium storing a program that causes a computer to function as the trajectory section determining unit 16*a*, the analyzing and integrating unit 16*b*, the storing and integrating unit 16*c*, and the wind speed calculating unit 16*d*.

The memory 105 is, for example, a nonvolatile or volatile semiconductor memory such as a random access memory (RAM), a read only memory (ROM), a flash memory, an erasable programmable read only memory (EPROM), or an electrically-EPROM (EEPROM), a magnetic disk, a flexible disk, an optical disc, a compact disc, a mini disc, a DVD, or the like.

The functions of the trajectory section determining unit 16*a*, the analyzing and integrating unit 16*b*, the storing and integrating unit 16*c*, and the wind speed calculating unit 16*d* may be partially implemented by dedicated hardware and partially implemented by software or firmware. For example, the function of the trajectory section determining unit 16*a* is implemented by a processing circuit that is dedicated hardware and the functions of the analyzing and integrating unit 16*b*, the storing and integrating unit 16*c*, and the wind speed calculating unit 16*d* are implemented by reading and executing a program stored in the memory 105 by the processor 104. In this way, the processing circuit can implement the above functions by hardware, software, firmware, or a combination thereof.

The laser radar device 3 may include a beam scanner.

Figure 6:
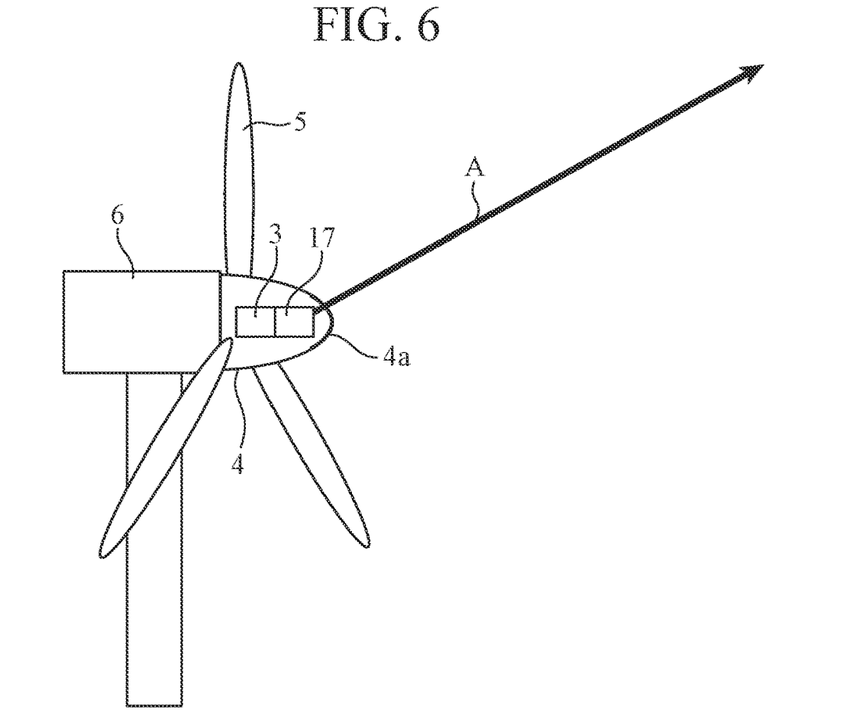
FIG. 6 is a schematic view illustrating a laser radar device including a beam scanner.

FIG. 6 is a schematic view illustrating the laser radar device 3 including a beam scanner 17. As illustrated in FIG. 6, the beam scanner 17 is arranged inside the spinner portion 4 on the laser light emission end of the laser radar device 3 and performs scanning with a laser beam emitted from the laser radar device 3.

For example, the beam scanner 17 spontaneously performs scanning with the laser beam A in such a manner that the laser beam A draws the trajectory B illustrated in FIG. 3. By performing scanning with the laser beam A along the trajectory B by the beam scanner 17 in addition to rotation of the spinner portion 4, the laser radar device 3 can measure wind speeds in all the divided sections in a shorter time.

Note that the type of the beam scanner 17 may be any type that can perform scanning with the laser beam A in such a manner that the laser beam A draws the trajectory B, and may be, for example, a wedge scanner type, a switch type, or a mirror type.

The trajectory section determining unit 16*a* may determine a divided section in which the laser beam A is present on the basis of the rotation angle information and the rotation speed information input from the wind turbine 2.

For example, the trajectory section determining unit 16*a* calculates time required for movement of the laser beam A from a measurement start point to a measurement end point in a divided section on the basis of the rotation angle information and the rotation speed information of the wind turbine 2 at the measurement start point in the divided section. The time calculated in this way is integration time (measurement time) for the analyzing and integrating unit 16*b* to integrate reception spectra in the above divided section. The trajectory section determining unit 16*a* can appropriately determine a divided section in which the laser beam A is present on the basis of the above integration time.

The trajectory B may be divided by the number of divisions for each distance in a line-of-sight direction of the laser beam A.

For example, the laser radar device 3 for outputting laser light in a pulse system can measure a wind speed at a plurality of distances in the line-of-sight direction of the laser beam A. When a distance in the line-of-sight direction of the laser beam A (measurement distance) is short, the size of the trajectory B drawn by the laser beam A is small, and when the distance in the line-of-sight direction of the laser beam A is long, the size of the trajectory B drawn by the laser beam A is large.

When the size of the trajectory B is small, a difference in altitude in a space in which a wind speed is measured is small, and therefore the number of divisions of the trajectory B is set to a small number. On the contrary, when the size of the trajectory B is large, a difference in altitude in a space in which a wind speed is measured is large, and therefore the number of divisions of the trajectory B is set to a large number. As a result, it is possible to avoid an unnecessary increase in the number of divisions of the trajectory B. Minimizing the number of divisions of the trajectory B means maximizing the wind speed measurement time for each divided section while the laser beam A makes one round around the trajectory B. As a result, a possibility that the wind speed measurement for a plurality of rounds will be avoided is increased, and a real-time property of the wind measurement is improved.

As described above, the laser radar device 3 according to the first embodiment includes the trajectory section determining unit 16a, the analyzing and integrating unit 16b, the storing and integrating unit 16c, and the wind speed calculating unit 16d. By including these components, the laser radar device 3 calculates a wind speed for each of a plurality of divided sections obtained by dividing the trajectory B drawn by the laser beam A in front of the wind turbine 2, and therefore can measure the wind speed with high accuracy.

The wind power generator 1 according to the first embodiment includes the laser radar device 3, and therefore can measure a wind speed with high accuracy. The wind measurement method according to the first embodiment calculates a wind speed for each of a plurality of divided sections obtained by dividing the trajectory B drawn by the laser beam A, and therefore can measure the wind speed with high accuracy.

Second Embodiment

Figure 7:
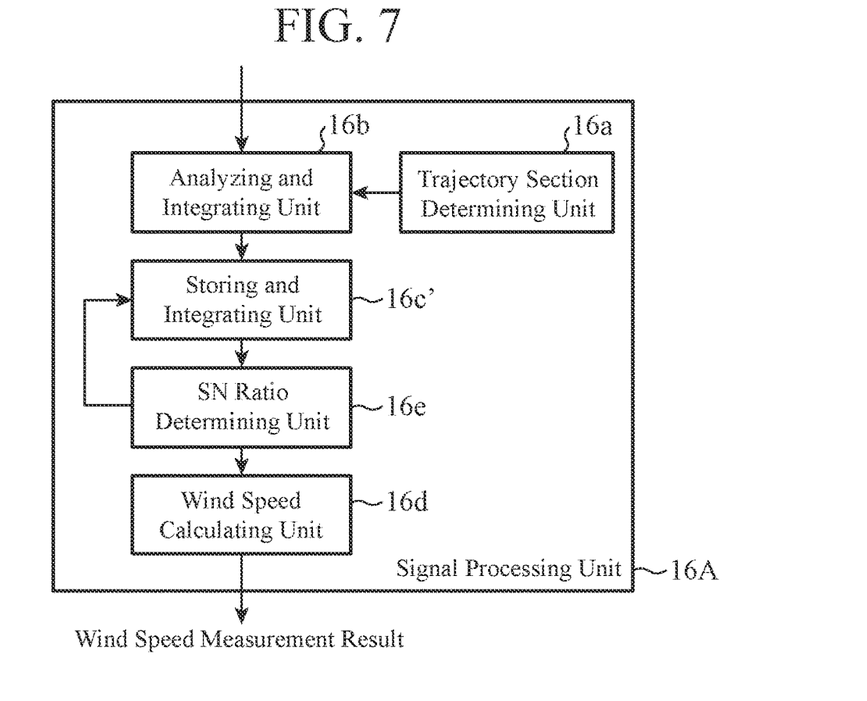
FIG. 7 is a block diagram illustrating a functional configuration of a signal processing unit included in a laser radar device according to a second embodiment of the present invention.

FIG. 7 is a block diagram illustrating a functional configuration of a signal processing unit 16A included in a laser radar device 3 according to a second embodiment of the present disclosure. In FIG. 7, the same components as those in FIG. 2 are denoted by the same reference numerals, and description thereof is omitted. The components other than the signal processing unit 16A in the laser radar device 3 according to the second embodiment are the same as those illustrated in FIG. 2. Furthermore, as in the first embodiment, the laser radar device 3 according to the second embodiment is installed on the spinner portion 4 of the wind turbine 2 illustrated in FIG. 1, and transmits laser light in an oblique direction with respect to a rotating shaft direction of the wind turbine 2 while rotating together with the spinner portion 4, and receives scattered light of the laser light.

The signal processing unit 16A analyzes reception signals input from the optical receiver 15 illustrated in FIG. 2, thereby calculates a reception spectrum for each distance in a line-of-sight direction of a laser beam A, and calculates a wind speed using the calculated reception spectrum. The signal processing unit 16A includes a trajectory section determining unit 16a, an analyzing and integrating unit 16b, a storing and integrating unit 16c', a wind speed calculating unit 16d, and an SN ratio determining unit 16e as functional components.

The SN ratio determining unit 16e determines whether or not an SN ratio of a reception spectrum stored in the storing and integrating unit 16c' is larger than a threshold. The SN ratio of a reception spectrum is a reception SN ratio determined from a peak intensity of the reception spectrum, and the threshold is a threshold regarding the reception SN ratio. An SN ratio larger than the threshold is an acceptable SN ratio, and an SN ratio equal to or smaller than the threshold is an unacceptable SN ratio.

For example, the SN ratio determining unit 16e receives a reception spectrum stored in the storing and integrating unit 16c' and detects a peak intensity of the input reception spectrum. The SN ratio determining unit 16e calculates, as a reception SN ratio, a ratio of a detected peak intensity to a standard deviation of the intensity on a frequency axis in a reception spectrum with only noise but no reception light. By comparing the SN ratio of a reception spectrum with the threshold, the SN ratio determining unit 16e outputs a reception spectrum having an SN ratio larger than the threshold to the wind speed calculating unit 16d, and outputs a reception spectrum having an SN ratio equal to or smaller than the threshold to the storing and integrating unit 16c'.

The storing and integrating unit 16c' stores a reception spectrum for which the SN ratio determining unit 16e has determined that the SN ratio is equal to or smaller than the threshold. The storing and integrating unit 16c' integrates reception spectra calculated by the analyzing and integrating unit 16b with the stored reception spectrum until the SN ratio determining unit 16e determines that the SN ratio is larger than the threshold.

The functions of the trajectory section determining unit 16a, the analyzing and integrating unit 16b, the storing and integrating unit 16c', the wind speed calculating unit 16d, and the SN ratio determining unit 16e are implemented by a processing circuit. The processing circuit may be the dedicated hardware processing circuitry 103 illustrated in FIG. 5A, or may be the processor 104 for executing a program stored in the memory 105 illustrated in FIG. 5B.

Next, operations will be described.

Figure 8:
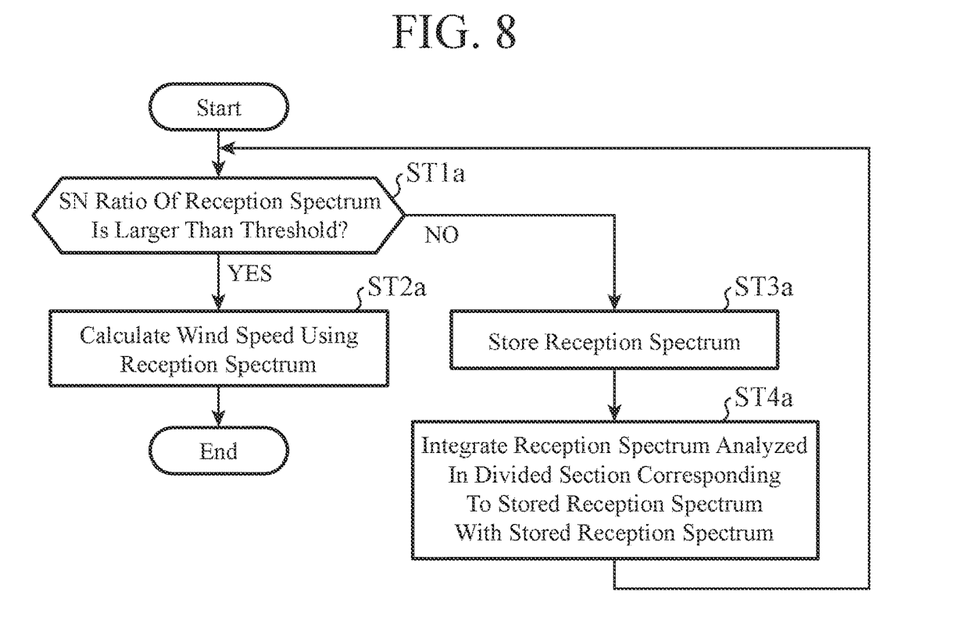
FIG. 8 is a flowchart illustrating a wind measurement method according to the second embodiment.

FIG. 8 is a flowchart illustrating a wind measurement method according to the second embodiment, and illustrates operation of the signal processing unit 16A in FIG. 7. The SN ratio determining unit 16e receives a reception spectrum for each divided section from the storing and integrating unit 16c' and determines whether or not an SN ratio of the reception spectrum for each divided section is larger than the threshold (step ST1a).

If it is determined that the SN ratio of the reception spectrum is larger than the threshold (step ST1a; YES), the SN ratio determining unit 16e outputs this reception spectrum to the wind speed calculating unit 16d. The wind speed calculating unit 16d calculates a wind speed using the reception spectrum input from the SN ratio determining unit 16e (step ST2a). A method for calculating a wind speed is the same as that in the first embodiment.

The SN ratio determining unit 16e notifies the storing and integrating unit 16c' of the determination result that the SN ratio of the reception spectrum is larger than the threshold. The storing and integrating unit 16c' erases the reception spectrum in the divided section indicated by this notification.

Meanwhile, if it is determined that the SN ratio of the reception spectrum is equal to or smaller than the threshold (step ST1a; NO), the SN ratio determining unit 16e does not output the reception spectrum to the wind speed calculating unit 16d but notifies the storing and integrating unit 16c' of the determination result that the SN ratio of the reception spectrum is equal to or smaller than the threshold. The storing and integrating unit 16c' stores a reception spectrum corresponding to the divided section indicated by this notification as it is (step ST3a).

When the laser beam A makes one round along the trajectory B with rotation of the spinner portion 4, the analyzing and integrating unit 16b, in the next round, analyzes reception signals and calculates reception spectra in the above divided section corresponding to the reception spectrum stored in the storing and integrating unit 16c', and integrates the reception spectra until measurement time in this divided section elapses. A reception spectrum calculated in this way is output from the analyzing and integrating unit 16b to the storing and integrating unit 16c'.

The storing and integrating unit 16c' further integrates the reception spectrum obtained in the above divided section by the analyzing and integrating unit 16b in the current round with the reception spectrum corresponding to the above divided section, stored in the previous round (step ST4*a*). This improves the SN ratio of the reception spectrum. Thereafter, the process returns to step ST1*a*.

The series of processes from step ST1*a* to step ST4*a* is repeatedly executed until an SN ratio of a reception spectrum stored in the storing and integrating unit 16c' becomes larger than the threshold. As a result, even when the concentration of aerosols in the atmosphere is low and a normally acceptable SN ratio of a reception spectrum cannot be ensured, the SN ratio is improved by integration of a reception spectrum, and a reception spectrum that can measure an effective wind speed value can be obtained.

The laser radar device 3 according to the second embodiment may include the beam scanner 17 illustrated in FIG. 6. For example, the beam scanner 17 spontaneously performs scanning with the laser beam A in such a manner that the laser beam A draws the trajectory B illustrated in FIG. 3. By performing scanning with the laser beam A along the trajectory B by the beam scanner 17, in addition to rotation of the spinner portion 4, the laser radar device 3 according to the second embodiment can measure wind speeds in all the divided sections in a shorter time.

Note that the type of the beam scanner 17 may be any type that can perform scanning with the laser beam A in such a manner that the laser beam A draws the trajectory B, and may be, for example, a wedge scanner type, a switch type, or a mirror type.

As in the first embodiment, the trajectory section determining unit 16a in the second embodiment may determine a divided section in which the laser beam A is present on the basis of rotation angle information of the wind turbine 2, or may determine a divided section in which the laser beam A is present on the basis of the rotation angle information and rotation speed information of the wind turbine 2.

Also the laser radar device 3 according to the second embodiment may divide the trajectory B drawn by the laser beam A in front of the wind turbine 2 by the number of divisions for each distance in a line-of-sight direction of the laser beam A, and may make the number of divisions of the trajectory B smaller in a case where the distance in the line-of-sight direction of the laser beam A is short than in a case where the distance is long. As a result, an unnecessary increase in the number of divisions of the trajectory B can be avoided, a possibility that the wind speed measurement for a plurality of rounds will be avoided is increased, and a real-time property of the wind measurement is improved.

As described above, the laser radar device 3 according to the second embodiment includes the SN ratio determining unit 16e. The wind speed calculating unit 16d calculates a wind speed using a reception spectrum for which the SN ratio determining unit 16e has determined that the SN ratio is larger than the threshold among reception spectra for respective divided sections stored in the storing and integrating unit 16c'. The storing and integrating unit 16c' stores a reception spectrum for which it has been determined that the SN ratio is equal to or smaller than the threshold, and integrates a reception spectrum calculated for a divided section corresponding to the stored reception spectrum with the stored reception spectrum until it is determined that the SN ratio is larger than the threshold. This improves the SN ratio of the reception spectrum.

Third Embodiment

Figure 9:
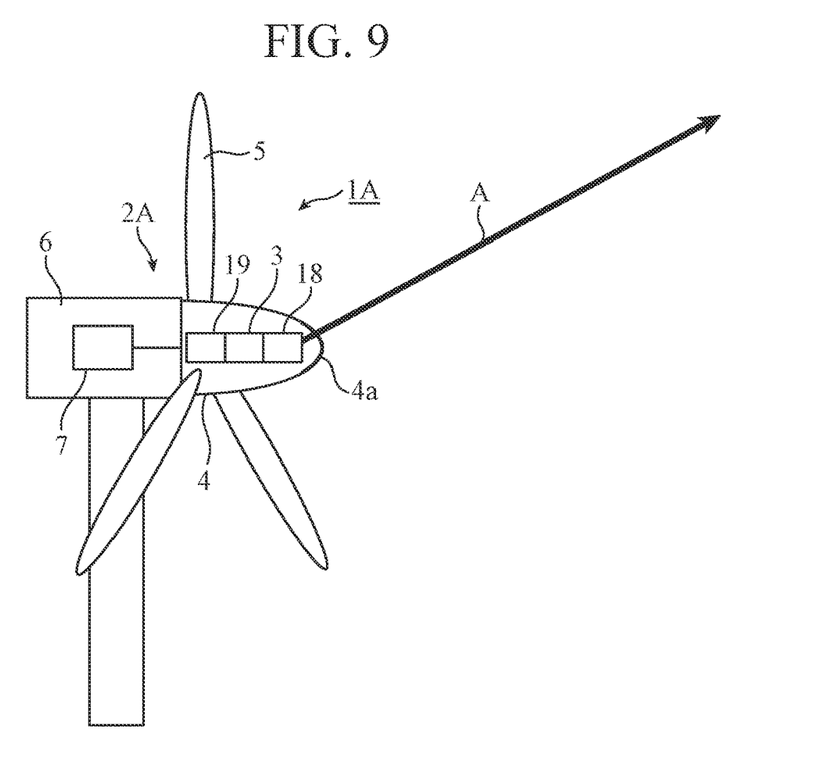
FIG. 9 is a schematic view illustrating a configuration of a wind power generator according to a third embodiment of the present invention.

FIG. 9 is a schematic view illustrating a configuration of a wind power generator 1A according to a third embodiment of the present disclosure. In FIG. 9, the wind power generator 1A includes a wind turbine 2A. A laser radar device 3 according to the third embodiment is installed on a spinner portion 4 of the wind turbine 2A and includes the same components as those illustrated in FIG. 2. The laser radar device 3 may include the signal processing unit 16A illustrated in FIG. 7 instead of the signal processing unit 16.

The laser radar device 3 according to the third embodiment further includes a beam scanner 18 and a jig 19. The beam scanner 18 is arranged inside the spinner portion 4 at the laser light emission end of the laser radar device 3 and perform scanning with a laser beam emitted from the laser radar device 3. The jig 19 holds the laser radar device 3 inside the spinner portion 4 and is fixed to a nacelle portion 6 of the wind turbine 2A in such a manner that the laser radar device 3 does not rotate together with the spinner portion 4.

The beam scanner 18 spontaneously perform scanning with a laser beam A in such a manner that the laser beam A draws, for example, the trajectory B illustrated in FIG. 3 not depending on the rotation of the spinner portion 4. In this case, a trajectory section determining unit 16a determines a divided section in which the laser beam A is present among a plurality of divided sections obtained by dividing the trajectory B drawn by the laser beam A with which the beam scanner 18 has performed scanning.

Note that the type of the beam scanner 18 may be any type that can spontaneously perform scanning with the laser beam A, and may be, for example, a wedge scanner type, a switch type, or a mirror type.

As in the first embodiment, an analyzing and integrating unit 16b integrates reception spectra calculated for each distance in a line-of-sight direction of the laser beam A for each divided section in which the trajectory section determining unit 16a has determined that the laser beam A is present. A storing and integrating unit 16c stores a reception spectrum calculated by the analyzing and integrating unit 16b for each divided section. A wind speed calculating unit 16d calculates a wind speed for each divided section using a reception spectrum for each divided section input from the storing and integrating unit 16c.

In the laser radar device 3 including the signal processing unit 16A instead of the signal processing unit 16, a storing and integrating unit 16c' stores a reception spectrum for which an SN ratio determining unit 16e has determined that the SN ratio is equal to or smaller than the threshold. When the laser beam A with which the beam scanner 18 has performed scanning makes one round along the trajectory B, the analyzing and integrating unit 16b, in the next round, analyzes reception signals and calculates reception spectra in a divided section corresponding to a reception spectrum stored in the storing and integrating unit 16c', and integrates the reception spectra until measurement time in this divided section elapses.

The storing and integrating unit 16c' further integrates the reception spectrum calculated in the above divided section by the analyzing and integrating unit 16b with the reception spectrum corresponding to the above divided section, stored in the previous round. The wind speed calculating unit 16d calculates a wind speed using a reception spectrum for which the SN ratio determining unit 16e has determined that the SN ratio is larger than the threshold among reception spectra stored in the storing and integrating unit 16c'.

The shape of the trajectory drawn by the laser beam A with which the beam scanner 18 has performed scanning does not have to be circular as long as being a trajectory extending over a plurality of altitude sections. For example, the beam scanner 18 may perform scanning with the laser beam A in such a manner that the laser beam A draws a polygonal trajectory, or may perform scanning with the laser beam A in such a manner that the laser beam A draws a linear trajectory (for example, a straight line extending over a plurality of altitude sections).

Also in this case, the trajectory is divided into sections in each of which a wind speed is considered to be uniform, and the laser radar device 3 performs wind measurement for each of the divided sections.

As described above, the laser radar device 3 according to the third embodiment includes the beam scanner 18 for perform scanning with the laser beam A not depending on rotation of the wind turbine 2A, and the jig 19 holding the laser radar device 3 inside the spinner portion 4 and fixed to the nacelle portion 6 in such a manner that the laser radar device 3 does not rotate together with the spinner portion 4. With this configuration, a wind speed can be measured without being affected by rotation of the wind turbine 2A.

Note that the present invention is not limited to the above embodiments, and the embodiments can be freely combined with one another, any component in the embodiments can be modified, or any component in the embodiments can be omitted within the scope of the present invention.

INDUSTRIAL APPLICABILITY

A laser radar device according to the present invention can measure a wind speed with high accuracy, and therefore can be used, for example, in a wind power generator for controlling a wind turbine using wind speed information.

REFERENCE SIGNS LIST

1, 1A: wind power generator, 2, 2A: wind turbine, 3: Laser radar device, 4: spinner portion, 4a: window, 5: blade, 6: nacelle portion, 7: generator, 8: light source, 9: splitter, 10: pulse modulator, 11: optical amplifier, 12: circulator, 13: optical system, 14: coupler, 15: optical receiver, 16, 16A: signal processing unit, 16a: trajectory section determining unit, 16b: analyzing and integrating unit, 16c, 16c': storing and integrating unit, 16d: wind speed calculating unit, 16e: SN ratio determining unit, 17, 18: beam scanner, 19: jig, 100: signal input interface, 101: information input interface, 102: information output interface, 103: processing circuit, 104: processor, 105: memory

The invention claimed is:

1. A laser radar device for transmitting laser light ahead of a wind turbine and receiving scattered light of the laser light scattered at a transmission destination, the laser radar device being installed in a spinner portion of the wind turbine, the laser radar device comprising:

processing circuitry
to determine a divided section in which a laser beam of the laser light is present among a plurality of divided sections obtained by dividing a trajectory drawn by the laser beam in front of the wind turbine;
per each divided section in which the laser beam is determined to be present, to analyze reception signals of the scattered light to calculate reception spectra for each distance in a line-of-sight direction of the laser beam, and integrate the calculated reception spectra;
to store a reception spectrum calculated for each divided section; and
to calculate a wind speed for each divided section using the reception spectrum for each divided section, wherein
the trajectory drawn by the laser beam in front of the wind turbine is divided by the number of divisions for each distance in a line-of-sight direction of the laser beam, and the number of divisions of the trajectory is made smaller in a case where the distance in the line-of-sight direction of the laser beam is short than in a case where the distance is long.

2. The laser radar device according to claim 1, wherein the processing circuitry is further configured
to determine whether or not a signal-to-noise ratio of the stored reception spectrum is larger than a threshold,
to calculate a wind speed using a reception spectrum whose signal-to-noise ratio is determined to be larger than the threshold among reception spectra for respective divided sections stored, and
to store a reception spectrum whose signal-to-noise ratio is determined to be equal to or smaller than the threshold, and integrate the calculated reception spectrum when the laser beam is present in a divided section corresponding to the stored reception spectrum with the stored reception spectrum until it is determined that the signal-to-noise ratio is larger than the threshold.

3. The laser radar device according to claim 1, wherein the processing circuitry is further configured
to determine the divided section in which the laser beam is present among the plurality of divided sections obtained by dividing the trajectory drawn by the laser beam in front of the wind turbine with rotation of the wind turbine on a basis of rotation angle information of the wind turbine.

4. The laser radar device according to claim 1, wherein the processing circuitry is further configured
to determine the divided section in which the laser beam is present among the plurality of divided sections obtained by dividing the trajectory drawn by the laser beam in front of the wind turbine with rotation of the wind turbine on a basis of rotation angle information and rotation speed information of the wind turbine.

5. The laser radar device according to claim 1, comprising a beam scanner for performing scanning with the laser beam in such a manner that the laser beam draws the trajectory in front of the wind turbine.

6. A wind power generator comprising the laser radar device according to claim 1.

7. A laser radar device for transmitting laser light ahead of a wind turbine and receiving scattered light of the laser light scattered at a transmission destination, the laser radar device being installed in a spinner portion of the wind turbine, the laser radar device comprising:

a jig holding the laser radar device inside the spinner portion and fixed to a nacelle portion of the wind turbine in such a manner that the laser radar device does not rotate together with the spinner portion;
a beam scanner for performing scanning with a laser beam of the laser light not depending on rotation of the wind turbine;
to determine a divided section in which the laser beam is present among a plurality of divided sections obtained by dividing a trajectory drawn in front of the wind turbine by the laser beam with which the beam scanner has performed scanning;

per each divided section the laser beam is determined to be present, to analyze reception signals of the scattered light to calculate reception spectra for each distance in a line-of-sight direction of the laser beam, and integrate the calculated reception spectra;

processing circuitry to store a reception spectrum calculated for each divided section; and to calculate a wind speed for each divided section using the reception spectrum for each divided section, wherein the trajectory drawn by the laser beam in front of the wind turbine is divided by the number of divisions for each distance in a line-of-sight direction of the laser beam, and the number of divisions of the trajectory is made smaller in a case where the distance in the line-of-sight direction of the laser beam is short than in a case where the distance is long.

8. A wind power generator comprising the laser radar device according to claim 7.

9. A wind measurement method of a laser radar device for transmitting laser light ahead of a wind turbine and receiving scattered light of the laser light scattered at a transmission destination, the laser radar device being installed in a spinner portion of the wind turbine, the wind measurement method comprising:

determining a divided section in which a laser beam of the laser light is present among a plurality of divided sections obtained by dividing a trajectory drawn by the laser beam in front of the wind turbine;

per each divided section in which the laser beam is determined to be present, analyzing reception signals of the scattered light to calculate reception spectra for each distance in a line-of-sight direction of the laser beam, and integrating the calculated reception spectra;

storing a reception spectrum calculated for each divided section; and calculating a wind speed for each divided section using the reception spectrum for each divided section, wherein the trajectory drawn by the laser beam in front of the wind turbine is divided by the number of divisions for each distance in a line-of-sight direction of the laser beam, and the number of divisions of the trajectory is made smaller in a case where the distance in the line-of-sight direction of the laser beam is short than in a case where the distance is long.

* * * * *